United States Patent Office 2,966,485
Patented Dec. 27, 1960

2,966,485
PRODUCTION OF ORGANIC ACID ESTERS OF CELLULOSE

Kenneth C. Laughlin, Summit, Robert J. Osborne, Scotch Plains, and Joseph G. Santangelo, Passaic, N.J., assignors to Celanese Corporation of America, New York, N.Y., a corporation of Delaware No Drawing. Filed May 9, 1956, Ser. No. 583,634

17 Claims. (Cl. 260—227)

This invention relates to the production of organic acid esters of cellulose by a continuous process.

In one process for the production of organic acid esters of cellulose, cellulose is reacted with an organic acid anhydride in the presence of an esterification catalyst and a solvent for the cellulose ester being formed, so that there is obtained at the completion of the esterification a homogeneous solution of said cellulose ester. This process has yielded eminently satisfactory results when carried out on a batch basis. When the process is carried out continuously it has been found difficult to obtain a uniform homogeneous product. Thus, the product of the continuous process may contain fractions of substantially different molecular weights, due to non-uniform degradation of the cellulose during esterification. The product of the continuous process may also contain portions which differ considerably in degree of esterification.

It is therefore an object of this invention to provide a novel continuous process for the production of more homogeneous organic acid esters of cellulose.

Other objects of this invention will be apparent from the following detailed description and claims. In this description and claims all proportions are by weight unless otherwise indicated.

By the present invention, there is provided a process for producing a highly uniform homogeneous cellulose ester solution continuously. In accordance with one aspect of this process, the cellulose and the organic acid anhydride are reacted together, in the presence of the solvent, in a plurality of successive reaction zones. Thus, the cellulose, organic acid anhydride and solvent may be fed to a first reaction zone where they are mixed thoroughly and where the esterification begins. The resulting reaction mixture is withdrawn, as a continuous stream, from the first reaction zone to a second reaction zone, and then to succeeding separate reaction zones in each of which the reaction mixture is agitated and in each of which the esterification reaction proceeds further. The volumetric rate of withdrawal from any one reaction zone is substantially equal to the rate of introduction of material into said zone, so that the process operates under steady state conditions with the volume of material in any one reaction zone remaining substantially constant throughout the continuous process after the initial start-up period. To obtain the desired homogeneity there should be employed at least 4 successive reaction zones. As a practical matter, the use of more than 20 zones is generally unnecessary.

One convenient form of apparatus for carrying out the process of this invention comprises a number of separate reactors, each equipped with a stirrer or other agitating means. Pumps may be provided for transporting the reaction mixture from one reaction zone to the next without any recirculation of the mixture from one reaction zone to a preceding reaction zone or there may be used a cascade type of apparatus in which the reaction mixture overflows continuously from each reactor to the succeeding reactor.

Prior to carrying out the esterification, the cellulose may advantageously be pretreated, according to the usual practice in the art, to increase its reactivity and thereby shorten the esterification time. Such pretreatment may be effected by adding to the cellulose small quantities of a lower aliphatic acid such as, for example, formic acid, acetic acid, propionic acid or butyric acid, as well as mixtures thereof. There may also be added to the cellulose during the pretreatment all or a portion of the esterification catalyst. The pretreatment of the cellulose may be carried out in a single stage, or in a plurality of stages, all as well known in the art.

The pretreated cellulose is then esterified with an organic acid anhydride corresponding to the organic acid ester of cellulose being formed, in the presence of a solvent for said ester. While the solvent may be of the well-known water-miscible type, e.g. acetic acid, the multi-zone continuous process of this invention is particularly advantageous when the solvent is water-immiscible. Suitable water-immiscible solvents for this purpose include, for example, nitromethane, m-cresol, cyclopentanone, pyrrole and furfural. Chlorinated hydrocarbon solvents such as methylene chloride, tetrachloroethane, trichloroethane, trichloroethanol and chloroform may also be employed for this purpose. Extremely valuable results are obtained when methylene chloride is employed as the solvent since it yields solutions that are especially well suited for spinning; i.e. for extrusion through spinning jets to form filaments. Instead of employing a single material as the solvent, a mixture of materials, such as those specified above, may be used for this purpose. The quantity of solvent may be varied as desired. Best results, however, are obtained when the amount of solvent is such that the viscosity of the reaction mixture is low enough to facilitate efficient mixing of the material in each separate reaction zone. Thus, when ordinary commercial unbaffled turbine-type mixers are used for stirring the material in the reaction zones, the viscosity of the mixture should not be above about 2,000 poises. On the other hand, the use of excessively large quantities of solvent is economically undesirable since it involves an added expense in recovering the solvent, so that it is best to use only enough of the solvent to reduce the viscosity of the mixture to the level where efficient stirring is practicable; accordingly, it is preferred to use a mixture which is sufficiently concentrated so that it attains a viscosity of at least 1500 poises in at least one of the reaction zones. It is, of course, possible to reduce the amount of solvent by the use of more efficient agitating devices in the separate reaction zones, particularly in those reaction zones where the viscosity of the mixture is highest. When methylene chloride is the solvent it is preferred to use about 20 to 40 parts of the methylene chloride for each part of cellulose. However, if desired, much larger amounts of solvent, e.g. 100 parts of methylene chloride per part of cellulose, may be used in which case the maximum viscosity attained in the system is much lower, e.g. on the order of 10 poises.

It will be understood that, due to the efficient mixing, the material withdrawn from any one zone has a composition which is substantially identical with the composition of the whole mass of material in said zone.

The quantity of organic acid anhydride is not critical, one suitable range being from about 2.4 to 5 or more moles of organic acid anhydride for each 100 parts by weight of cellulose. The quantity of organic acid anhydride specified is the excess over that required to react with any water which may be introduced into the esterification mixture with the cellulose, the pretreating agent, the water-immiscible solvent or from any other source.

The quantity of acid esterification catalyst, such as perchloric acid, that is present during the esterification process may range from as little as 0.5% by weight, or less, to as much as about 5% by weight, or even more, based on the weight of the cellulose, with smaller quantities of catalyst requiring longer reaction times. Other catalysts, such as sulfuric acid, anhydrous ferric chloride or aromatic and aliphatic sulfonic acids, may also be used, but perchloric acid is preferred because of its strong catalytic action and ease of removal.

It is desirable in the continuous process of this invention to maintain the temperature of each reaction zone constant throughout the process. The temperatures in the various reaction zones may be all substantially the same or they may differ in any desired predetermined relation. The esterification reaction is generally exothermic and most of the heat of reaction mixture usually is given off at the beginning of the reaction. The provision of a plurality of separate reaction zones makes it possible to remove this heat of reaction efficiently by cooling the first reactor, or the first few reactors; the temperatures of the reactors through which the reaction mixture passes subsequently may be maintained at any desired level by insulating them or by applying any suitable heating or cooling means thereto. Thus, the process of this invention has the added advantage of facilitating very fine control of the temperature of the reaction mixture at any stage of the process. The esterification is normally carried out at temperatures of about 0 to 60° C. The reaction is preferably carried out at atmospheric pressure, but higher or lower pressures may be employed if desired.

As the reaction mixture passes from zone to zone and the esterification reaction proceeds, the organic acid ester of cellulose being formed will dissolve in the esterification mixture so that at the end of the esterification there will be obtained a substantially homogeneous solution. This solution will contain, in addition to the organic acid ester of cellulose and the solvent therefor, the acid esterification catalyst, the unreacted organic acid anhydride and a certain proportion of organic acid. The organic acid is derived from a number of sources including the pretreatment acid, the organic acid that is formed by the reaction of the organic acid anhydride with any water that is present in the esterification mixture, the organic acid that is formed by the esterification reaction and any organic acid that is initially present in the organic acid anhydride.

After the reaction mixture has passed through the successive separate reaction zones it may be treated to cause the complete esterification of any small amount of undissolved partly esterified cellulose which may be present. To this end, the reaction mixture may be passed through a filtering type of apparatus, such as a packed column, which acts to slow down the rate of movement of any undissolved material while permitting relatively free passage of the solution. The undissolved material is therefore subjected to the esterification mixture for a longer period of time than the dissolved material and is thus substantially completely esterified, and dissolved, before it leaves the packed column or similar apparatus. When the reaction mixture is not subjected to such a treatment, a greater number of successive reaction zones must be used to obtain the same degree of homogeneity in the product. Thus products of the same degree of homogeneity are produced using 8 successive separate reaction zones and a final treatment in a packed column or 16 successive separate reaction zones without such final treatment.

For best results the volumes of reaction mixture in each of the successive reaction zones should be about equal, so that the average retention times of the mixture in all zones are about the same. Of course, the process may be practiced using different average retention times in different zones, but in such cases it is found that it is necessary to provide more reaction zones or to make the total volume of the reaction zone larger in order to obtain a product whose homogeneity is equal to that of the material produced when the retention times are equal.

The "average retention time," as referred to herein, denotes the quotient of the volume of material in a reaction zone divided by the volumetric rate at which the material is introduced into, or withdrawn from, said zone.

After completion of the esterification reaction the solution of the cellulose ester may be treated in any desired manner. Thus, when the solvent used is water-immiscible, e.g. methylene chloride, the solution may be treated in the manner described in detail in the copending application of Steinmann, Serial No. 470,825, filed November 23, 1954, now matured ito United States Patent No. 2,849,442, issued August 28, 1958, wherein the acid esterification catalyst is neutralized with a nitrogeneous base and then subjected to a two-phase extraction with an aqueous medium to remove water-soluble materials, without precipitating the cellulose ester, so as to produce a solution which is capable of being spun directly or which may be converted into a spinning solution by such simple operations as distillation or drying with dehydrating agent, or both, all as described in said Steinmann application. Alternatively, the solution of the cellulose ester in the water-immiscible solvent at the completion of the esterification reaction may be treated by the somewhat similar method disclosed in detail in an earlier copending application of Steinmann, Serial No. 443,957, filed July 16, 1954, now matured into United States Patent 2,849,441, issued August 28, 1958. As described in each of the above Steinmann applications, the solution may be subjected to a ripening treatment, if desired. It will be understood of course, that one need not employ the methods described by Steinmann but may use conventional procedures for handling the solution obtained on completion of esterification. For example, this solution may be subjected to any of the desulfation treatments disclosed in the U.S. Patent to Rosen et al., No. 2,628,232, or the ripening treatments disclosed in the U.S. Patent to Martin et al., No. 2,539,586, the U.S. Patent Seymour et al., No. 2,470,192 or the U.S. Patent to Rowley et al., No. 2,461,572.

The following example is given to illustrate this invention further.

*Example*

107 parts of cotton linters comprising 100 parts of cellulose and 7 parts of water are pretreated by mixing with 50 parts of glacial acetic acid for one hour and then allowing the mixture to stand for 8 hours. The pretreated cotton linters are then fed continuously to the first of a series of sixteen successive separate reactors together with 25 parts of methylene chloride per part of cellulose, 3 parts of acetic anhydride per part of cellulose (i.e. about 3 moles of anhydride per 100 parts of cellulose), and 0.01 part of perchloric acid per part of cellulose. The mixture flows from one reactor to the next and is stirred thoroughly in each reactor. The average times of retention of the mixture in all of the reactors are equal, the average retention time in each reactor being 9 minutes and the total average retention time in the series of reactors being 145 minutes. All of the reactors are maintained in a bath having a temperature of 16° C., the temperature in the first reactor being about 21° C., in the second reactor 20–21° C., in the third 18–19° C., in the fourth and fifth 16–17° C. and in all subsequent reactors about 16° C. The reaction product leaving the sixteenth reactor is mixed with an amount of pyridine sufficient to effect neutralization of the catalyst and an amount of water sufficient to react with all the unreacted acetic anhydride. The cellulose acetate in the resulting material is completely acetylated and highly homogeneous.

It is to be understood that the foregoing detailed description is given merely by way of illustration and that many variations may be made therein without departing from the spirit of our invention.

Having described our invention what we desire to secure by Letters Patent is:

1. In the process for the production of cellulose esters by the reaction of cellulose and an organic acid anhydride in the presence of a solvent for the cellulose ester being formed, the improvement which comprises blending cellulose, said anhydride and said solvent to form a reacting mixture and passing said reacting mixture, while said reaction is taking place, continuously and successively through a plurality of separate successive reaction zones, withdrawing continuously from the last of said successive reaction zones a mixture in which substantially all of the cellulose is esterified and dissolved, but containing a small amount of undissolved, partly esterified cellulose, and continuously passing said withdrawn reacting mixture through a filtering reaction zone which slows down the rate of movement of undissolved material while permitting free passage of solution.

2. In the process for the production of cellulose esters by the reaction of cellulose and an organic acid anhydride in the presence of a solvent for the celllulose ester being formed, the improvement which comprises passing continuously a mixture of said cellulose, said anhydride and said solvent successively through a plurality of separate reaction zones and agitating the mixture in each of said reaction zones, the extent of agitation being such that the material withdrawn from one reaction zone and fed to the next reaction zone has substantially the same composition as the mass of material retained in said one reaction zone.

3. In the process for the production of cellulose esters by the reaction of cellulose and an organic acid anhydride in the presence of a solvent for the cellulose ester being formed, the improvement which comprises passing continuously a mixture of said cellulose, said anhydride and said solvent successively through a plurality of separate reaction zones and agitating the mixture in each of said reaction zones, the extent of agitation being such that the material withdrawn from one reaction zone and fed to the next reaction zone has substantially the same composition as the mass of material retained in said one reaction zone while preventing return of material from succeeding to preceding reaction zones.

4. Process as set forth in claim 3 and in which the mixture passes through at least 8 successive reaction zones.

5. Process as set forth in claim 2 and in which the mixture passes through at least 4 successive reaction zones.

6. Process as set forth in claim 2 and in which the viscosity of the mixture in said reaction zones is at most about 2,000 poises.

7. Process as set forth in claim 2 and in which the maximum viscosity the mixture attains in said reaction zones ranges from about 10 poises to about 2,000 poises.

8. Process as set forth in claim 2 and in which said solvent is a water-immiscible organic solvent.

9. Process as set forth in claim 2 and in which said anhydride is acetic anhydride and said solvent is methylene chloride.

10. Process as set forth in claim 9 and in which there are present about 20 to 40 parts of methylene chloride per part of cellulose.

11. Process as set forth in claim 4 and in which the average retention times of said mixture in all of said reaction zones are about equal.

12. Process as set forth in claim 2 in which the reaction mixture comprises about 2.4 to 5 moles of said anhydride per 100 parts of said cellulose.

13. Process as set forth in claim 2 in which the reaction mixture comprises about 2.4 to 5 parts of acetic anhydride per 100 parts of cellulose.

14. Process as set forth in claim 13 in which said solvent comprises methylene chloride, the amount of solvent being about 20 to 40 parts per part of cellulose.

15. Process as set forth in claim 14 in which said reaction mixture contains a catalyst comprising perchloric acid.

16. Process as set forth in claim 2 in which the reaction temperature in said zones is about 0 to 60° C.

17. Process as set forth in claim 3 and in which the maximum viscosity the mixture attains in said zones ranges from about 1,500 poises to about 2,000 poises.

References Cited in the file of this patent

UNITED STATES PATENTS

| | | |
|---|---|---|
| 1,859,579 | Bidaud | May 24, 1932 |
| 1,870,980 | Altwegg | Aug. 9, 1932 |
| 2,126,190 | Hofmann | Aug. 9, 1938 |
| 2,739,879 | Bates et al. | Mar. 27, 1956 |